United States Patent
Rainville et al.

(10) Patent No.: US 7,514,171 B2
(45) Date of Patent: Apr. 7, 2009

(54) CATHODE TRANSIENT HUMIDITY CONTROL IN A FUEL CELL SYSTEM

(75) Inventors: Joseph D. Rainville, Caledonia, NY (US); Bruce J. Clingerman, Palmyra, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 320 days.

(21) Appl. No.: 11/450,565

(22) Filed: Jun. 9, 2006

(65) Prior Publication Data

US 2007/0287042 A1    Dec. 13, 2007

(51) Int. Cl.
*H01M 8/04* (2006.01)
(52) U.S. Cl. .................................. 429/26; 429/23
(58) Field of Classification Search ................ 429/26, 429/34, 23, 13, 22
See application file for complete search history.

(56) References Cited

U.S. PATENT DOCUMENTS

| | | | |
|---|---|---|---|
| 6,884,534 B2 | 4/2005 | Wheat et al. | |
| 2006/0263654 A1* | 11/2006 | Goebel et al. | 429/13 |

* cited by examiner

*Primary Examiner*—Patrick Ryan
*Assistant Examiner*—Thomas H. Parsons

(57) ABSTRACT

A fuel cell system that selectively causes cathode input air to by-pass a water vapor transfer (WVT) device during high to low power transients. During normal stack operation, the cathode input air is sent through the WVT device to humidify the cathode input air for proper membrane humidification. For low power stack operation, where the cathode input airflow is reduced, which reduces the ability of the airflow to drive water out of the cathode flow channels, a by-pass valve is switched so the cathode inlet air by-passes the WVT device to reduce the cathode inlet humidification. In one embodiment, heaters at the ends of the stack are turned on during the low power condition to further reduce the accumulation of water in the end channels of the stack.

18 Claims, 1 Drawing Sheet

CATHODE TRANSIENT HUMIDITY CONTROL IN A FUEL CELL SYSTEM

BACKGROUND OF THE INVENTION

1. Field of the Invention

This invention relates generally to a fuel cell system and, more particularly, to a fuel cell system that includes a by-pass valve for by-passing a water vapor transfer device at the cathode inlet during low power transients to reduce cathode air humidification.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For example, a typical fuel cell stack for a vehicle may have two hundred or more stacked fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As is well understood in the art, the membranes within a fuel cell need to have a certain relative humidity so that the ionic resistance across the membrane is low enough to effectively conduct protons. During operation of the fuel cell, moisture from the MEAs and external humidification may enter the anode and cathode flow channels. At low cell power demands, typically below 0.2 A/cm$^2$, the water may accumulate within the flow channels because the flow rate of the reactant gas is too low to force the water out of the channels. As the water accumulates, droplets form in the flow channels. As the size of the droplets increases, the flow channel is closed off, and the reactant gas is diverted to other flow channels because the channels are in parallel between common inlet and outlet manifolds. As the droplet size increases, surface tension of the droplet may become stronger than the delta pressure trying to push the droplets to the exhaust manifold so the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

As mentioned above, water is generated as a by-product of the stack operation. Therefore, the cathode exhaust from the stack will include water vapor and liquid water. It is known in the art to use a water vapor transfer (WVT) unit to capture some of the water in the cathode exhaust, and use the water to humidify the cathode input airflow.

When the fuel cell stack output power is reduced to a low power condition, such as during vehicle idling, water tends to accumulate in the cathode flow channels because the cathode airflow and delta pressure is not large enough to drive the water out of the flow channels. Thus, the low power condition has a greater likelihood for causing low performing cells that reduce the performance of the stack and the ability of the stack to ramp up to high power when a large fuel cell stack output power is requested.

SUMMARY OF THE INVENTION

In accordance with the teachings of the present invention, a fuel cell system is disclosed that selectively causes cathode input air to by-pass a water vapor transfer (WVT) device during high to low power transients. During normal stack operation, the cathode input air is sent through the WVT device to humidify the cathode input air for proper membrane humidification. For low power stack operation, where the cathode input airflow is reduced, which reduces the ability of the airflow to drive water out of the cathode flow channels, a by-pass valve is switched so the cathode inlet air by-passes the WVT device to reduce the cathode inlet humidification. In one embodiment, heaters at the ends of the stack are turned on during the low power condition to further reduce the accumulation of liquid water in the end channels of the stack.

Additional features of the present invention will become apparent from the following description and appended claims, taken in conjunction with the accompanying drawings.

DETAILED DESCRIPTION OF THE EMBODIMENTS

Figure 1:
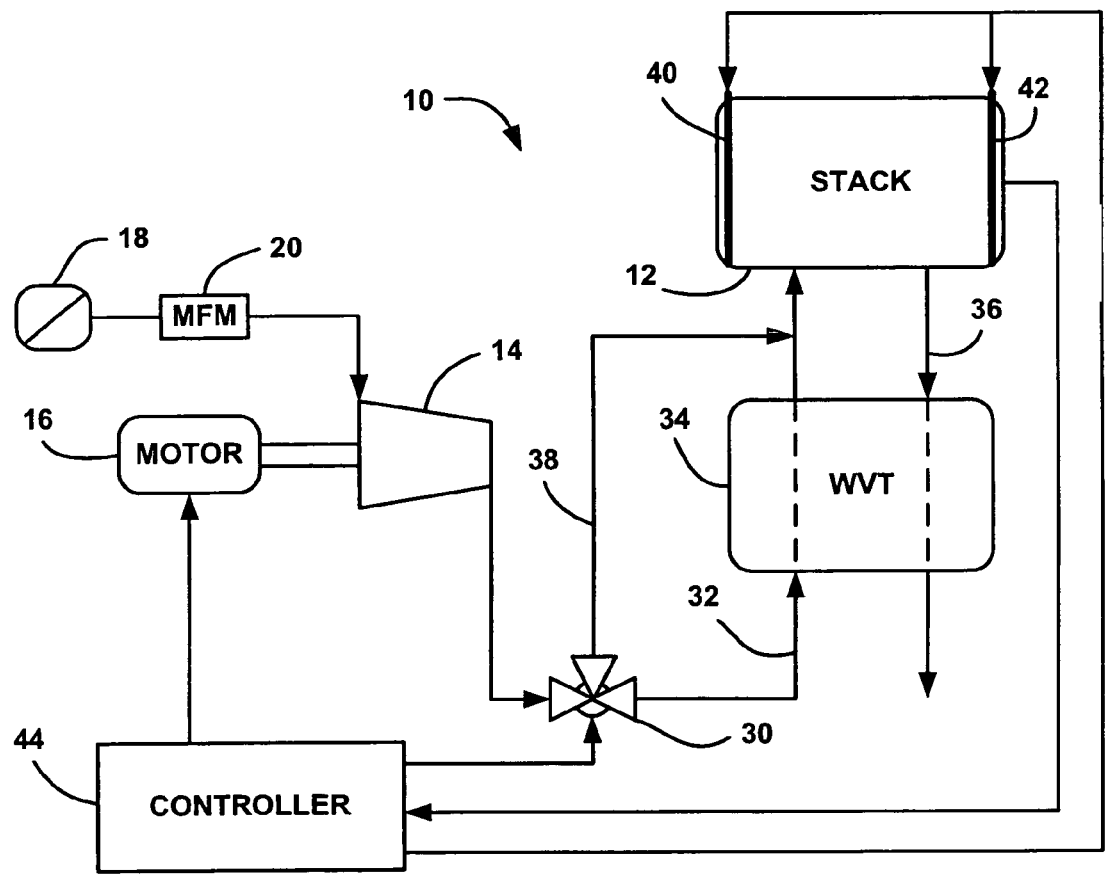
FIG. 1 is a schematic diagram of a fuel cell system including a by-pass valve for allowing cathode input air to by-pass a WVT device, according to an embodiment of the present invention.

The following discussion of the embodiments of the invention directed to a fuel cell system that selectively by-passes a water vapor transfer device at the cathode inlet during high to low power transients is merely exemplary in nature, and is no way intended to limit the invention or its. applications or uses FIG. 1 is a schematic block diagram of a fuel cell system 10 including a fuel cell stack 12. As discussed above, the fuel cell stack 12 includes a series of bipolar plates that have cathode flow channels for the cathode side of the fuel cells and anode flow channels for the anode side of the fuel cells. Cathode input air is provided by a compressor 14 that is driven by a motor 16. The speed of the motor 16 determines how much airflow is sent to the cathode side of the stack 12. The airflow is sucked into the compressor 14 through an air filter 18 and is measured by a mass flow meter 20.

The cathode input air from the compressor 14 is sent through a by-pass valve 30 to a cathode input line 32. The cathode air flowing through the input line 32 is sent through a WVT device 34 to be humidified before being input into the cathode side of the stack 12. The WVT device 34 can be any suitable humidification unit, many of which are well know to those skilled in the art. Cathode exhaust gas is output on exhaust line 36 that has been humidified from the water by-product generated by fuel cell operation. The water in the cathode exhaust gas in the line 36 is used by the WVT device 34 to humidify the cathode inlet air. For example, the cathode exhaust gas may wet a membrane in the WVT device 34, which is transferred to the cathode input air. Several techniques are known in the art to control the humidity of the cathode input air based on system operating parameters, such as by measuring the relative humidity of the cathode exhaust gas and then using control valves (not shown) to control how much of the cathode exhaust gas flows through the WVT device 34 and how much by-passes the WVT device 34.

According to the invention, the by-pass valve 30 is used to allow the cathode input air to by-pass the WVT device 34. Particularly, a controller 44 receives power input commands from, for example, a throttle of a vehicle. When the controller 44 detects a low power request, such as vehicle idle, the controller 44 switches the by-pass valve 30 to cause the cathode input air to by-pass the WVT device 34 on a by-pass line 38 so that it is dry when it enters the stack 12. For example, if the output load of the stack 12 is relatively high, such as 60 kW, and the user requests low stack power, such as 10 kW, where less airflow will be required from the compressor 14 reducing the ability of the air to force water out of the flow channels in the stack 12, by-passing the WVT device 34 reduces the amount of water in the cathode flow channels, which reduces the need for forcing water out of the cathode flow channels that could otherwise reduce cell performance. The system 10 will be calibrated so that the WVT device 34 is not by-passed unless the reduction in stack power is large enough, such as more than 40 kW.

During the by-pass of the WVT device 34, the ramp down of the compressor 14 can be delayed for a short period of time by driving the motor 16 at a higher speed than is required for the current stack output power so that the dry cathode input air on the line 38 is able to both force out accumulated water in the flow channels, and absorb water in the flow channels.

Once the stack 12 has reached the low power condition and is stabilized, the controller 44 switches the by-pass valve 30 back to allow the cathode input air to flow through the WVT device 34 for normal stack operation where the outlet humidity of the cathode exhaust gas on line 36 sets the inlet humidity for the particular stack power.

Typically there is an end structure at the top and bottom of the stack 12 that extend across the active area of the stack 12. It is known in the art to provide end cell heaters in this structure that have particular application for warming the stack 12 during cold system start-ups. According to another embodiment of the present invention, end cell heaters 40 and 42 are provided in the end structures of the stack 12. In one embodiment, the end cell heaters 40 and 42 are resistive heaters that receive an electrical current to provide the heat. In this embodiment of the invention, the end cell heaters 40 and 42 receive a control signal from the controller 44 during the high to low power transient to further help with water transport through the cathode flow channels. Particularly, it is known that the fuel cells at the ends of the stack 12 are the most susceptible to flooding, and thus the most likely to be low performing. By turning on the end cell heaters 40 and 42 during high to low power transients, additional heat is provided to the fuel cells at the ends of the stack 12 that provide greater water evaporation and faster gas transport as a result of the heat.

As will be appreciated by those skilled in the art, the time for the by-pass around the WVT device 34, the speed of the compressor 14 during the high to low power transients, and the time that the end heaters 40 and 42 are on can be calibrated based on the size of the downward power transient. For example, for a small downward transient, a shorter time for the by-pass around the device 34, shorter end cell heater operation, and a smaller increase in compressor speed would be provided. Further, the discussion above refers to controlling the by-pass of the device 34, the compressor speed and the end cell heaters 40 and 42 during a downward power transient. However, these three things can also be controlled during a low power condition to control the cathode humidity.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
    a fuel cell stack;
    a cathode input line providing cathode input air to the stack;
    a water vapor transfer device receiving and humidifying the cathode input air flowing through the cathode input line;
    a cathode by-pass line for allowing the cathode input air to by-pass the water vapor transfer device;
    a by-pass valve for switching the flow of the cathode input air between the cathode input line and the cathode by-pass line; and
    a controller for controlling the by-pass valve, said controller detecting a high to low power request or a low power condition and switching the cathode input air to the cathode by-pass line during the high to low power request or low power condition so as to send dry cathode input air to the stack.

2. The system according to claim 1 wherein the controller switches the by-pass valve to the cathode input line to allow the cathode input air to flow through the water vapor transfer device once the stack output power reaches the low power request and is stabilized.

3. The system according to claim 1 further comprising a compressor that provides the cathode input air to the by-pass valve, said controller controlling the compressor so that a compressor speed reduction is delayed during the high to low power request so that more cathode input air than is necessary to operate the stack at the lower power condition is provided on the by-pass line.

4. The system according to claim 1 further comprising a first end heater positioned at one end of the stack and a second end heater positioned at an opposite end of the stack, said controller turning on the end heaters during the high to low power request or the low power condition.

5. The system according to claim 1 wherein the water vapor transfer device receives a cathode exhaust gas on a cathode exhaust gas line to provide the humidification for the cathode input air.

6. The system according to claim 1 wherein the fuel cell system is on a vehicle.

7. The system according to claim 6 wherein the low power request is an idle condition.

8. A fuel cell system comprising:
a fuel cell stack;
a compressor for providing cathode input air to the stack;
a cathode input line directing the cathode input air to the stack;
a water vapor transfer device receiving and humidifying the cathode input air flowing through the cathode input line, wherein the water vapor transfer device receives a cathode exhaust gas on a cathode exhaust gas line to provide the humidification for the cathode input air;
a cathode by-pass line for allowing the cathode input air to by-pass the water vapor transfer device;
a by-pass valve for switching the flow of the cathode input air between the cathode input line and the cathode by-pass line; and
a controller for controlling the by-pass valve, said controller detecting a high to low power request or a low power condition and switching the cathode input air to the cathode by-pass line during the high to low power request or low power condition so as to send dry cathode input air to the stack, said controller controlling the compressor so that a compressor speed reduction is delayed during the high to low power request so that more cathode input air than is necessary to operate the stack at the lower power condition is provided on the by-pass line.

9. The system according to claim 8 wherein the controller switches the by-pass valve to the cathode input line to allow the cathode input air to flow through the water vapor transfer device once the stack output reaches the low power request and is stabilized.

10. The system according to claim 8 further comprising a first end heater positioned at one end of the stack and a second end heater positioned at an opposite end of the stack, said controller turning on the end heaters during the high to low power request.

11. The system according to claim 8 wherein the fuel cell system is on a vehicle.

12. The system according to claim 11 wherein the low power request is an idle condition.

13. A method for controlling the humidity of a cathode input airflow to a fuel cell stack, said method comprising:
directing the cathode input airflow through a water vapor transfer device before it is sent to the fuel cell stack to humidify the cathode input airflow; and
by-passing the water vapor transfer device during a high to low power transient or a low power condition to provide dry cathode input airflow to the fuel cell stack.

14. The method according to claim 13 further comprising allowing the cathode input air to flow through the water vapor transfer device once the stack output power reaches the low power condition and is stabilized.

15. The method according to claim 13 further comprising operating a compressor during the high to low power transient so that a compressor speed reduction is delayed during the high to low power transient so that more cathode input air than is necessary to operate the stack at the lower power condition is provided to the stack.

16. The method according to claim 13 further comprising turning on end cell heaters in the stack during the high to low power transient.

17. The method according to claim 13 wherein the water vapor transfer device receives a cathode exhaust gas on a cathode exhaust gas line to provide the humidification for the cathode input air.

18. The method according to claim 13 wherein the high to low power transient stabilizes to an idle condition of a fuel cell vehicle.

* * * * *